Patented June 26, 1934

1,964,654

UNITED STATES PATENT OFFICE

1,964,654

SULPHONATION PRODUCTS OF URETHANES AND PROCESS FOR MAKING SAME

Heinrich Ulrich and Paul Koerding, Ludwigshafen-on-the-Rhine, Germany, assignors to I. G. Farbenindustrie Aktiengesellschaft, Frankfort-on-the-Main, Germany No Drawing. Application December 22, 1931, Serial No. 582,651. In Germany December 27, 1930

10 Claims. (Cl. 260—98)

The present invention relates to the production of urethane derivatives suitable as wetting, cleansing and dispersing agents.

We have found that valuable wetting, cleansing and dispersing agents are obtained by sulphonating urethanes containing at least one sulphonatable group, i. e. at least one hydroxy group or double linkage. The urethanes used as the initial materials are compounds having the general constitutional formula:

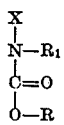

in which R and $R_1$ are hydrocarbon radicles at least one of which contains at least one double linkage and/or at least one hydroxyl group. Thus R may be any hydrocarbon radicle which may also contain hydroxyl and/or unsaturated groups, for example there may be present a vinyl, propenyl, butenyl, di-propenyl, hexyl, lauryl, oleyl-octodecyl, cetyl, benzyl, phenyl, toluyl, diphenyl, naphthyl, cyclohexyl, benzidine, furfuryl, hydroxyethyl, hydroxypropyl, hydroxybutyl, octanol or decanol radicle; $R_1$ is any hydrocarbon radicle which may be the same as that defined by R provided at least one of the said radicles contains one of the aforesaid unsaturated or hydroxyl groups (if desired both radicles may contain one or more of the said groups); X may be a further hydroxy-alkyl radicle or any organic radicle or a hydrogen atom. When the alcohol radicle of the urethane (R in the above formula) carries one or more hydroxyl groups or an unsaturated group, the substituents on the nitrogen atom may be hydrogen or radicles free from hydroxyl groups; in any case the sum of the carbon atoms of R and $R_1$ should be at least 4.

The said urethanes may be prepared for example by the conversion of ammonia bases containing at least one reactive hydrogen atom fixed to N, i. e. ammonia, any primary or secondary amines or hydroxy-alkyl amines containing one or more nitrogen atoms, with chloro-carbonic esters of mono- or polyhydric alcohols or phenols. Instead of the simple hydroxy-alkyl urethanes the hydroxy ethers obtainable by adding on the said urethanes one or more molecules of alkylene oxides may be employed.

The sulphonation is effected generally at from 0° to about 90° C. by treatment of the urethanes with sulphonating agents, as for example with concentrated sulphuric acid, oleum, chlorsulphonic acid or sulphur trioxide, and may be carried out in the presence or absence of inert solvents such as ethyl ether, carbon tetrachloride, tetra chlorethane, or nitrobenzene. At least one molecular proportion of the sulphonating agent is employed for each sulphonatable group present. An addition of anhydrous organic acids, acid anhydrides or acid chlorides may be chosen to promote the sulphonation. Depending on the reaction conditions and the sulphonating agents, the products obtainable in the said manner are sulphuric esters (in which the hydroxyl groups of the hydroxyalkyl radicles have reacted with the sulphuric acid and the like) or true sulphonic acids (i. e. compounds in which the sulphonic group is directly attached to carbon) or simultaneously sulphonic acids and sulphuric esters. If the initial materials contain hydroxyl groups, usually sulphuric esters are obtained, whereas sulphonic acids are obtained by acting with chlorsulphonic acid on unsaturated urethanes.

The sulphonation products either as such or in the form of their alkali metal or alkaline earth metal salts, are valuable auxiliary agents for wetting, washing, emulsifying, levelling and softening purposes for the textile, paper, leather or lacquer industries. They are suitable, for example, as additions to carbonizing, mercerizing, washing, spinning and dyeing baths, and may also be advantageously employed for fulling, dressing textiles and rendering artificial silk supple. They are also eminently suitable as dispersing agents, as for example in the preparation of printing pastes. An important field of employment consists in their use for the preparation of emulsions or solutions of water-soluble or water-insoluble substances such as waxes, oils, fats, solvents or dyestuffs. For example valuable lubricants, boring oils or polishing agents may be prepared with the aid of the said sulphonation products.

The sulphonation products of the said urethanes may be employed either alone or in admixture with soaps, soap-like substances, salts, such as Glauber's salt, Epsom salt, perborates, hypochlorites or glue, gelatine, gum arabic or dextrin.

The following examples will further illustrate the nature of this invention, but the invention is not restricted to these examples. The parts are by weight.

Example 1

100 parts of the urethane obtainable from equimolecular amounts of monobutanol amine and the chlorocarbonic acid ester of octodecyl alcohol are dissolved in 400 parts of ethyl ether and sulphonated at from about 20° to 30° C. with 150 parts of chlorosulphonic acid. The sulphonation product thus obtained is freed from the acid present by pouring onto a mixture of ice and water and separating the aqueous layer, and converted into the sodium salt with caustic soda solution whereupon the ether is distilled off. The salt has an excellent washing action.

Solvents other than ether, such as carbon tetrachloride may be used for the sulphonation.

Example 2

100 parts of the urethane obtainable from monoethanol amine and the chlorocarbonic acid ester of lauryl alcohol are introduced while cooling to about 20° C. into 300 parts of concentrated sulphuric acid and then warmed to about 40° C. for 2 hours while stirring. After removing the excess of acid by stirring the reaction mixture into a double quantity of a mixture of ice and water, precipitating the sulphonation product by means of butyl acetate, neutralizing with alkali and evaporating the solvent in vacuo, a product is obtained which may be employed in acid treatment baths for textiles, as for example for fulling or carbonizing.

The alkali metal salts of the sulphonation product obtained in the manner described may also be employed with advantage as wetting and dispersing agents.

Example 3

100 parts of the urethane obtainable by the action of cyclohexyl monoethanol amine on the chlorocarbonic acid ester of benzyl alcohol are dissolved in 200 parts of carbon tetrachloride and stirred with 120 parts of chlorsulphonic acid at 20° C. until a sample completely dissolves in water after evaporation of the solvent. The resulting reaction product is poured into ice-water and the solvent and the excess of sulphuric acid are removed as described in Example 2.

The sulphonation product thus obtained is eminently suitable as a wetting or emulsifying agent for many purposes in the textile industries.

Example 4

40 parts of the N-phenyl urethane of octodecyl alcohol (obtainable by acting at from 25° to 30° C. with the chlorocarbonic ester of octodecyl alcohol on an emulsion of aniline in an aqueous solution of caustic soda) are introduced at room temperature into 40 parts of concentrated sulphuric acid. After warming for several hours to about 70° C. the reaction product is poured onto 50 parts of ice. The remaining sulphuric acid is precipitated by means of lime, whereupon the sulphonic acid is converted into its sodium salt, which latter constitutes an efficient wetting and washing agent.

Example 5

120 parts of chlorosulphonic acid, dissolved in 200 parts of ethylenechloride, are introduced, while maintaining the temperature at 30° C. by cooling, into a solution of 180 parts of the urethane obtainable by the action of monoethanol amine on the chloro-carbonic acid ester of oleyl alcohol. The mixture is then slowly heated to about 50° C. and, after cooling, the whole is poured into 300 parts of a mixture of ice and water. The reaction mixture is neutralized by means of an aqueous solution of caustic soda and the ethylene chloride is removed by distillation. An aqueous emulsion of the di-sodium salt of an urethane derivative, containing simultaneously an acid sulphuric ester group and a sulphonic acid group, is thus obtained.

The emulsion constitutes an excellent wetting and washing agent.

What we claim is:—

1. The sulphonation products of urethanes containing at least one sulphonatable group selected from the class consisting of aliphatic double linkages and of hydroxyl groups fixed to an aliphatic group of said urethanes.

2. The sulphonation products of urethanes containing at least one hydroxyl group fixed to an aliphatic group of said urethanes.

3. The sulphonation products of urethanes containing at least one aliphatic double linkage.

4. The sulphonation product of the p-hydroxy butyl urethane of octodecyl alcohol.

5. The sulphonation product of the p-hydroxy ethyl urethane of lauryl alcohol.

6. The sulphonation product of the N-phenyl urethane of octodecyl alcohol.

7. The process for the production of urethane derivatives suitable as wetting, cleansing and emulsifying agents, which comprises sulphonating a urethane containing at least one sulphonatable group.

8. The process for the production of urethane derivatives suitable as wetting, cleansing and emulsifying agents which comprises sulphonating a urethane containing at least one hydroxyl group.

9. The process for the production of urethane derivatives suitable as wetting, cleansing and emulsifying agents which comprises sulphonating a urethane containing at least one double linkage.

10. The process for the production of urethane derivatives suitable as wetting, cleansing and emulsifying agents which comprises sulphonating a urethane containing at least one hydroxyl group and a double linkage.

HEINRICH ULRICH.
PAUL KOERDING.